May 15, 1962  G. D. BLACK  3,034,533
GAS MIXING VALVES

Filed May 11, 1959  2 Sheets-Sheet 1

Inventor
GEOFFREY DONALD BLACK
By
Aaron R. Townshend Attorney

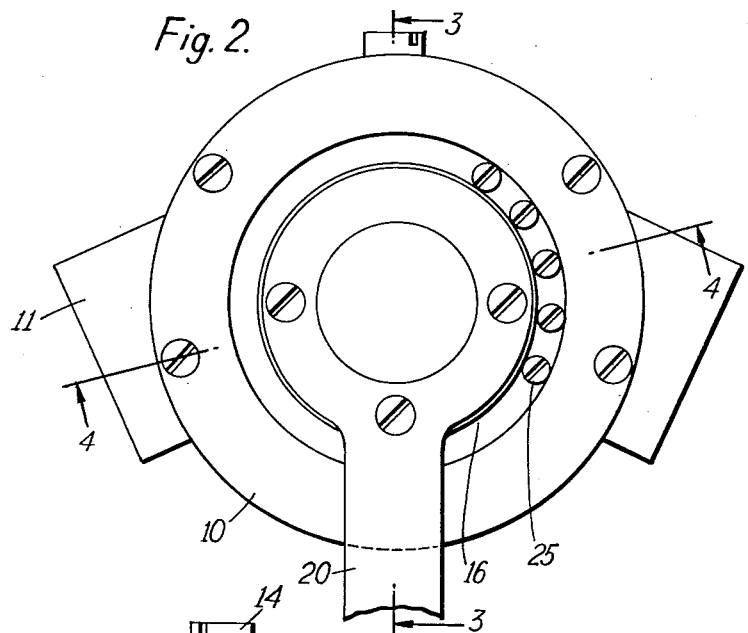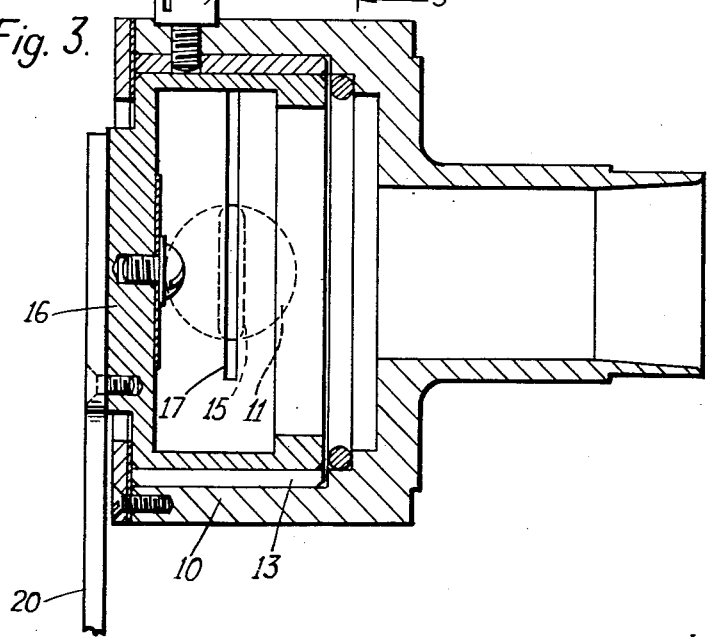

United States Patent Office 3,034,533
Patented May 15, 1962

3,034,533
GAS MIXING VALVES
Geoffrey Donald Black, Tottenham, England, assignor to The British Oxygen Company Limited, a British company
Filed May 11, 1959, Ser. No. 812,520
Claims priority, application Great Britain May 15, 1958
2 Claims. (Cl. 137—637)

This invention relates to rotary drum gas mixing valves and to trimming means therefor. These valves may be incorporated, for example, in apparatus for administering inhalant gas mixtures for analgesic anaesthetic purposes.

Valves of this type comprise a ported sleeve, means for supplying each gas to be mixed to a separate port in the sleeve, and a close-fitting drum within the sleeve provided with orifices, each orifice being adapted to communicate with one of the ports. The interior of the drum is connected to a mixed gas outlet. The area of the orifices in communication with the respective ports may be varied by relative rotation between the drum and the sleeve. In order to ensure that the composition of the gas mixture is maintained constant irrespective of variations in flow demand, the input pressures are maintained substantially equal so that the gas mixture ratio is dependent only upon the relative areas of the orifices in communication with the ports.

Relative rotation between the drum and the sleeve may be effected, for example, by means of a control lever attached either to the drum or to the sleeve, the angular position of the lever being determined by reference to a graduated scale so as to indicate the composition of the gas mixture for each setting of the lever.

Ideally it should be possible to control the dimensional accuracy of the various component parts of the valve, for example, the orifices, so closely that the gas mixture ratio at any particular setting of the lever would be correct within narrow limits. In practice however, it is impracticable to machine the parts to the required degree of accuracy and if they are made within suitable manufacturing tolerances it is found that in some cases there is a disconformity between the indicated and the actual composition of the gas mixture.

It is an object of the present invention to provide means for ensuring that the composition of the gas mixture delivered by mixing valves of the type specified conforms accurately to an indicated value at each selected position of the drum relative to the sleeve.

According to the present invention in a gas mixing valve of the type specified at least one of the orifices is provided with trimming means for adjusting the area of that part of the orifice in register with the port at each of one or more selected positions of the drum relative to the sleeve.

According to a feature of the invention the trimming means comprises a plurality of movable valve elements, each obturator being independently adapted partially to occlude a portion of the orifice, and the number of valve elements corresponding to the number of selected positions of the drum relative to the sleeve.

According to a further feature of the invention, manually adjustable means are provided for moving the valve elements.

According to another feature of the invention the valve elements are spring-biassed to a position in which the orifices are completely uncovered.

If the valve is required to deliver a constant volume of gas over a range of gas mixtures of for example from 100% of one gas to 100% of the other gas, rotation of the drum so as to increase the effective area of one orifice must be arranged so as to decrease proportionally the effective area of the other orifice. The input pressures are maintained constant for example by means of a pressure-equalising mechanism.

Rotation of the sleeve may be effected by means of a control lever which is associated with an indicating pointer, the pointer being arranged to co-operate with a graduated scale so as to indicate the composition of the gas mixture for each setting of the lever.

The orifices are preferably formed as slots disposed along an arc of the wall of the drum or they may consist of a graded series of holes and slots.

It is desirable to make one of the orifices slightly oversize so that there is normally a slight excess over the indicated value of the gas discharged from this orifice, for all settings of the control lever. The trimming means may then conveniently be associated with this orifice but trimming means may of course be associated with both orifices.

A valve constructed in accordance with the invention and suitable for mixing two gases, for example nitrous oxide and oxygen, will now be described with reference to the drawings in which:

FIG. 2 is an end view of the mixing valve.

FIG. 3 is a section taken along the line 3—3 of FIG. 2 and

Figure 1:
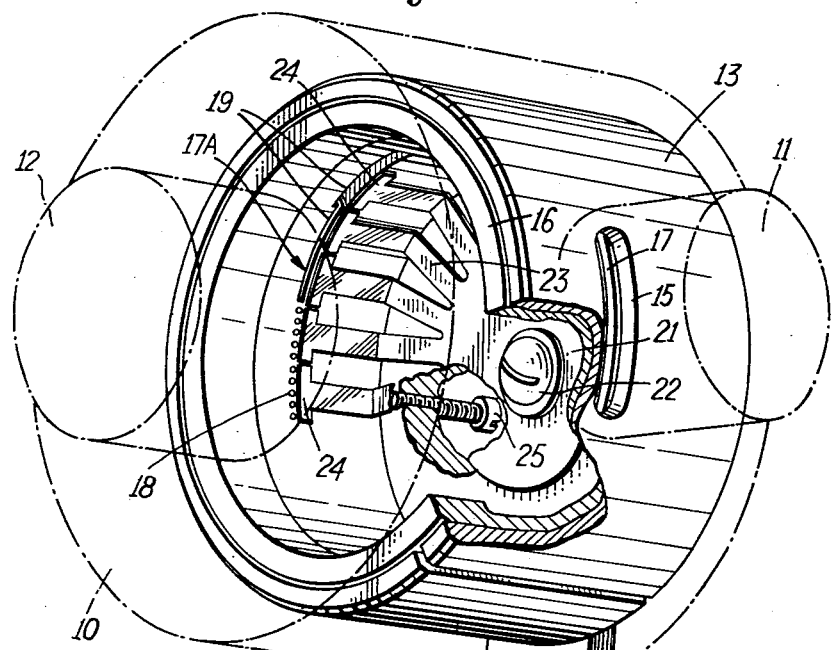
FIG. 1 is a schematic perspective view of the drum and sleeve with portions cut away to show the internal construction and the valve casing and gas inlet and outlet shown in dotted lines.
Figure 4:
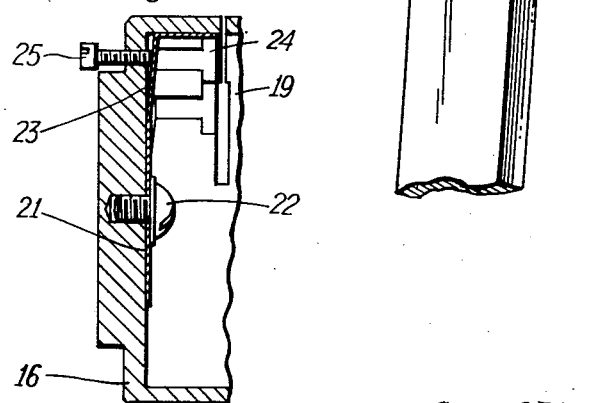
FIG. 4 is a section taken along the line 4—4 of FIG. 2 with the valve casing and sleeve omitted.

The valve comprises a casing 10 having diametrically opposed inlets 11 for admitting the respective gases and an outlet 12 for the mixed gases. Suitable pressure equalising means are provided to ensure that the gases are supplied to the inlets 11 at equal pressures of a preselected value. A split sleeve 13 fixed within the casing by means of screws 14 is provided with a pair of ports 15, only one of which is shown, which communicate with the respective gas inlets 11. A drum 16 which is a close fit within the sleeve 13 and is mounted for rotation therein has a pair of orifices 17 and 17A adapted to communicate to a greater or lesser extent with the respective ports 15.

The orifice 17A is shown as a compound orifice consisting of a series of holes 18 and slots 19. A lever 20 for rotating the drum 16 within the sleeve 13 is secured externally to the end face of the drum and is associated with an indicating pointer and graduated scale (not shown). The orifice 17A is made slightly oversize with respect to orifice 17, so that for each position of the lever 20, there will be a slight excess over the indicated value of the gas discharged from orifice 17A.

Before mounting the drum in the casing, the split in the sleeve 13, which facilitates assembly, may be closed, for example, with adhesive tape.

The orifice 17A is associated with trimming means consisting of a plate 21 secured to the internal end face of the drum 16 by a screw 22, the plate having a number of projecting fingers 23 which extend radially to the periphery of the end face and are bent over at right angles so as to lie against the wall of the drum. The ends 24 of the fingers each serve as valve elements for a separate portion of the orifice 17A. Adjusting screws 25 extend through the end face of the drum, each contacting the radial section one of the trimming fingers 23. When all the screws are backed off, the natural resiliency of the plate 21 and fingers 23 maintains the valve elements 24 clear of the orifice.

The valve is assembled with the adjusting screws 25 backed off, the control lever 20 is then set to the lowest of a number of selected positions on the scale and the gases are turned on. The gases flow through the inlets 11, ports 15 and orifices 17 and 17A into the interior of the drum 16 from which the mixed gases are delivered through the outlet 12.

The composition of the gas mixture at the outlet 12 is measured at a predetermined pressure setting and flow rate.

There will normally be a slight excess over the indicated value of the gas discharged from orifice 17A. The appropriate screw 25 is therefore adjusted to displace its associated valve element 23 and partially occlude that part of the orifice, i.e. the first group of holes 18, in register with the respective port 15, until by trial and error the flow rate of gas from the orifice is reduced to the extent necessary to produce a gas mixture conforming exactly with the indicated value. This operation is repeated for each selected position of the lever 29, adjusting each valve element 24 in turn so that the mixture ratio over the entire range is correct. Once all the screws 25 have been adjusted they may be locked in position, for example, by means of a hard-setting varnish or some similar material.

I claim:

1. A gas mixing valve comprising in combination a sleeve having separate ports in its circumference for the supply of each gas to be mixed, a drum fitting closely and rotatably within the sleeve and defining a gas mixing chamber, said drum having orifices in its circumference adapted to register with the respective ports to a degree varied by relative rotation between the drum and the sleeve and having at one end an outlet for mixed gases, operating means for causing relative rotation between the drum and the sleeve, and masking means associated with at least one of the orifices comprising a plate secured to the end of the drum remote from the mixed gas outlet, said plate having an arcuate extension projecting into the gas mixing chamber in contact with the wall of the drum, both the plate and its arcuate extension having slots formed therein to define separate valve elements, each valve element being capable of varying the effective area of the orifices, and manually operable means for moving each valve element.

2. A gas mixing valve according to claim 1 wherein a plate is made of resilient material such as spring steel, whereby the valve elements are biased towards a position in which the orifice is unmasked, and the manually operable means for moving the valve elements comprises a plurality of adjustable screws extending through the end wall of the drum to which said plate is secured, each screw being adapted to engage one of said valve elements.

References Cited in the file of this patent

UNITED STATES PATENTS

| | | |
|---|---|---|
| 1,421,765 | Cunningham | July 4, 1922 |
| 2,626,160 | Brumbaugh | Jan. 20, 1953 |
| 2,650,613 | Brumbaugh | Sept. 1, 1953 |
| 2,845,948 | Parker | Aug. 5, 1958 |

FOREIGN PATENTS

| | | |
|---|---|---|
| 637,448 | France | of 1928 |